(12) United States Patent
Perez et al.

(10) Patent No.: US 10,215,145 B2
(45) Date of Patent: Feb. 26, 2019

(54) DUAL CONTROLLER AREA NETWORK (CAN) STARTER

(71) Applicant: Honda Motor Co., Ltd., Tokyo (JP)

(72) Inventors: Jose A. Perez, Dublin, OH (US); Satoshi Furuhashi, Dublin, OH (US)

(73) Assignee: Honda Motor Co., Ltd., Tokyo ( * ) Notice: Subject to any disclaimer, the term of this patent is extended or adjusted under 35 U.S.C. 154(b) by 88 days.

(21) Appl. No.: 15/442,738

(22) Filed: Feb. 27, 2017

(65) Prior Publication Data

US 2018/0245561 A1 Aug. 30, 2018

(51) Int. Cl.
*F02N 11/08* (2006.01)
*B60R 16/023* (2006.01)

(52) U.S. Cl.
CPC ........ *F02N 11/0848* (2013.01); *B60R 16/023* (2013.01); *F02N 11/087* (2013.01); *F02N 2011/0874* (2013.01)

(58) Field of Classification Search
CPC ........... F02N 11/087; F02N 2011/0874; B60R 16/023
USPC ....................................... 701/113; 123/179.3
See application file for complete search history.

(56) References Cited

U.S. PATENT DOCUMENTS

| | | | |
|---|---|---|---|
| 6,104,157 A * | 8/2000 | Kramer | F02N 11/0851 318/430 |
| 6,282,668 B1 | 8/2001 | Neudecker | |
| 7,717,076 B2 * | 5/2010 | Gandert | B60W 10/06 123/179.3 |
| 7,742,855 B2 | 6/2010 | Louise | |
| 8,157,035 B2 | 4/2012 | Whitney et al. | |
| 8,249,760 B2 | 8/2012 | Lazzara | |
| 8,290,691 B2 | 10/2012 | Lin et al. | |
| 8,406,944 B2 | 3/2013 | Garon et al. | |
| 8,705,527 B1 * | 4/2014 | Addepalli | H04W 4/046 370/389 |
| 9,694,766 B2 * | 7/2017 | Mullen | B60R 16/023 |
| 2008/0004765 A1 * | 1/2008 | Falter | B60R 16/023 701/33.9 |
| 2013/0282946 A1 | 10/2013 | Ricci | |
| 2015/0019079 A1 | 1/2015 | Romanato | |
| 2016/0196176 A1 | 7/2016 | Thompson | |
| 2018/0131539 A1 * | 5/2018 | Michel | H04L 12/40176 |

FOREIGN PATENT DOCUMENTS

| | | |
|---|---|---|
| CN | 102416913 | 4/2012 |
| CN | 202545089 | 11/2012 |
| CN | 103174574 | 6/2013 |

* cited by examiner

*Primary Examiner* — Erick R Solis
(74) *Attorney, Agent, or Firm* — Rankin, Hill & Clark LLP

(57) ABSTRACT

According to one or more aspects, a dual controller area network (CAN) is used to start a vehicle. A dual CAN bus network includes a first CAN (CAN1) bus and a second CAN (CAN2) bus. A transmission control unit (TCU) is in communication with an engine control unit (ECU) via the dual CAN bus network. The ECU controls actuation of a starter motor based on signals from the CAN1 bus and signals from the CAN2 bus sent by the TCU. Actuation of the starter motor places an engine of the vehicle in a starting mode.

20 Claims, 16 Drawing Sheets

Mode Selection Table: Before Starting

OK: P or N signal received (Start Enable)
NG: Except P or N signal received (Disable)
CS/AC: Checksum or alive counter error
NR: Open/Not Received

| Before Starting | | |
|---|---|---|
| CAN1 | CAN2 | Mode Select |
| OK | OK | Auto |
| OK | NR | Manual* |
| NR | OK | Manual* |
| NR | NR | Disable |
| CS/AC | OK | Disable |
| CS/AC | NG | Disable |
| CS/AC | CS/AC | Disable |
| CS/AC | NR | Disable |
| OK | CS/AC | Disable |
| NG | CS/AC | Disable |
| NR | CS/AC | Disable |
| NR | NG | Disable |
| NG | NR | Disable |
| OK | NG | Disable |
| NG | OK | Disable |
| NG | NG | Disable |

FIG.3

Mode Selection Table: During Starting

OK: P or N signal received (Start Enable)
NG: Except P or N signal received (Disable)
CS/AC: Checksum or alive counter error
NR: Open/Not Received

| During Starting | | | |
|---|---|---|---|
| CAN1 | CAN2 | Mode Select (Auto) | Mode Select (Manual) |
| OK | OK | Auto | Manual |
| OK | NR | Auto | Manual |
| NR | OK | Auto | Manual |
| NR | NR | Auto | Manual |
| CS/AC | OK | Disable | Disable |
| CS/AC | NG | Disable | Disable |
| CS/AC | CS/AC | Disable | Disable |
| CS/AC | NR | Disable | Disable |
| OK | CS/AC | Disable | Disable |
| NG | CS/AC | Disable | Disable |
| NR | CS/AC | Disable | Disable |
| NR | NG | Disable | Disable |
| NG | NR | Disable | Disable |
| OK | NG | Disable | Disable |
| NG | OK | Disable | Disable |
| NG | NG | Disable | Disable |

FIG.4

DUAL CONTROLLER AREA NETWORK (CAN) STARTER

BACKGROUND

Typically, a starter is controlled using a direct wire input to a fuel injection engine control unit (FI-ECU). In other words, the starter is directly connected to the FI-ECU via a direct wire. Alternatively, a combination of a controller area network (CAN) and a direct wire input may be utilized to control the starting of the starter (e.g., a mixed CAN/direct wire system which transmits information regarding the transmission position to the FI-ECU).

In the direct wire system, a direct wire connection is provided for communication between the FI-ECU and a transmission control unit (TCU). In the mixed CAN/direct wire system, the CAN network merely includes a single CAN bus which independently communicates information regarding the transmission position between the TCU and the FI-ECU.

BRIEF DESCRIPTION

According to one or more aspects, a dual controller area network (CAN) system for starting a vehicle is provided. The system includes a transmission control unit (TCU), an engine control unit (ECU), and a dual CAN bus network. The dual CAN bus network includes a first CAN (CAN1) bus and a second CAN (CAN2) bus. The TCU is in communication with the ECU via the dual CAN bus network. The ECU controls actuation of a starter motor based on one or more signals from the CAN1 bus and one or more signals from the CAN2 bus sent by the TCU. Actuation of the starter motor places an engine of the vehicle in a starting mode.

In one or more embodiments, the TCU transmits a first start enable signal, a first alive counter signal, and a first checksum signal, via the CAN1 bus to the ECU and the ECU controls actuation of the starter motor based on the first start enable signal, the first alive counter signal, and the first checksum signal. In one or more embodiments, the TCU transmits a second start enable signal, a second alive counter signal, and a second checksum signal, via the CAN2 bus to the ECU and the ECU controls actuation of the starter motor based on the second start enable signal, the second alive counter signal, and the second checksum signal.

The ECU may enable actuation of the starter motor in an automatic mode based on a first start enable signal from the CAN1 bus being associated with the vehicle in park (P) or neutral (N) and a second start enable signal from the CAN2 bus also being associated with the vehicle in P or N. The ECU may enable actuation of the starter motor, before the engine is in the starting mode, in a manual mode based on a first start enable signal from the CAN1 bus being associated with the vehicle in park (P) or neutral (N) or a second start enable signal from the CAN2 bus being associated with the vehicle in P or N and the other start enable signal being associated with a not received (NR) signal. The ECU may enable actuation of the starter motor, while the engine is in the starting mode, based on a first start enable signal from the CAN1 bus being associated with the vehicle in park (P) or neutral (N) or a second start enable signal from the CAN2 bus being associated with the vehicle in P or N or the first start enable signal or the second start enable signal being associated with a not received (NR) signal.

The ECU may enable actuation of the starter motor based on consecutive passing start enable signals from the CAN1 bus and consecutive passing start enable signals from the CAN2 bus. The ECU may disable actuation of the starter motor, before the engine is in the starting mode, based on a failing checksum signal or a failing alive counter signal from either the CAN1 bus or the CAN2 bus. The ECU may disable actuation of the starter motor, while the engine is in the starting mode, based on consecutive failing checksum signals or consecutive failing alive counter signals from either the CAN1 bus or the CAN2 bus. The ECU may enable actuation of the starter motor, while the engine is in the starting mode, based on a first start enable signal from the CAN1 bus being associated with a not received (NR) signal and a second start enable signal from the CAN2 bus the NR signal for less than a threshold period of time. The ECU may disable actuation of the starter motor, while the engine is in the starting mode, based on a first start enable signal from the CAN1 bus being associated with a not received (NR) signal and a second start enable signal from the CAN2 bus the NR signal for greater than a threshold period of time.

The ECU may continue actuation of the starter motor based on a TCU ignore timer signal. The TCU ignore timer signal may be set to count down for a predetermined amount of time after a first start enable signal from the CAN1 bus and a second start enable signal from the CAN2 bus are active. The ECU may continue actuation of the starter motor while the TCU ignore timer is counting down.

The CAN1 bus may be associated with a first period and the CAN2 bus may be associated with a second period which is different than the first period. The system may include a powertrain control unit (PCU) generating a start signal based on a user input and the ECU may control actuation of the starter motor based on the start signal.

According to one or more aspects, a dual controller area network (CAN) system for starting a vehicle is provided. The system may include a transmission control unit (TCU), an engine control unit (ECU), a powertrain control unit (PCU), a dual CAN bus network. The dual CAN bus network may include a first CAN (CAN1) bus and a second CAN (CAN2) bus. The TCU may be in communication with the ECU via the dual CAN bus network. The ECU may control actuation of a starter motor based on one or more signals from the CAN1 bus, one or more signals from the CAN2 bus, and a signal from the PCU.

In one or more embodiments, the TCU transmits a first start enable signal, a first alive counter signal, and a first checksum signal, via the CAN1 bus to the ECU and the ECU controls actuation of the starter motor based on the first start enable signal, the first alive counter signal, and the first checksum signal. In one or more embodiments, the TCU transmits a second start enable signal, a second alive counter signal, and a second checksum signal, via the CAN2 bus to the ECU and the ECU controls actuation of the starter motor based on the second start enable signal, the second alive counter signal, and the second checksum signal.

The ECU may enable actuation of the starter motor in an automatic mode based on a first start enable signal from the CAN1 bus being associated with the vehicle in park (P) or neutral (N) and a second start enable signal from the CAN2 bus also being associated with the vehicle in P or N. The ECU may enable actuation of the starter motor, before the engine is in a starting mode, in a manual mode based on a first start enable signal from the CAN1 bus being associated with the vehicle in park (P) or neutral (N) or a second start enable signal from the CAN2 bus being associated with the vehicle in P or N and the other start enable signal being associated with a not received (NR) signal.

According to one or more aspects, a dual controller area network (CAN) system for starting a vehicle is provided, and includes a transmission control unit (TCU), an engine control unit (ECU), a starter motor in communication with the ECU, and a dual CAN bus network. The dual CAN bus network includes a first CAN (CAN1) bus and a second CAN (CAN2) bus. The TCU may be in communication with the ECU via the dual CAN bus network. The ECU may control actuation of the starter motor based on one or more signals from the CAN1 bus and one or more signals from the CAN2 bus.

BRIEF DESCRIPTION OF THE DRAWINGS

FIG. 3 is an exemplary mode selection table utilized by an engine control unit (ECU) of a dual controller area network (CAN) system for starting a vehicle, according to one or more embodiments.

FIG. 4 is an exemplary mode selection table utilized by an engine control unit (ECU) of a dual controller area network (CAN) system for starting a vehicle, according to one or more embodiments.

DETAILED DESCRIPTION

As used herein, "cranking" may refer to the starting of an engine of a vehicle by, for example, turning the crankshaft of the engine. In other words, "cranking" may refer to a state of the engine of the vehicle after starting is attempted, but prior to the starting being completed, such that the engine is in a starting mode (e.g., between not started and started).

Figure 1:
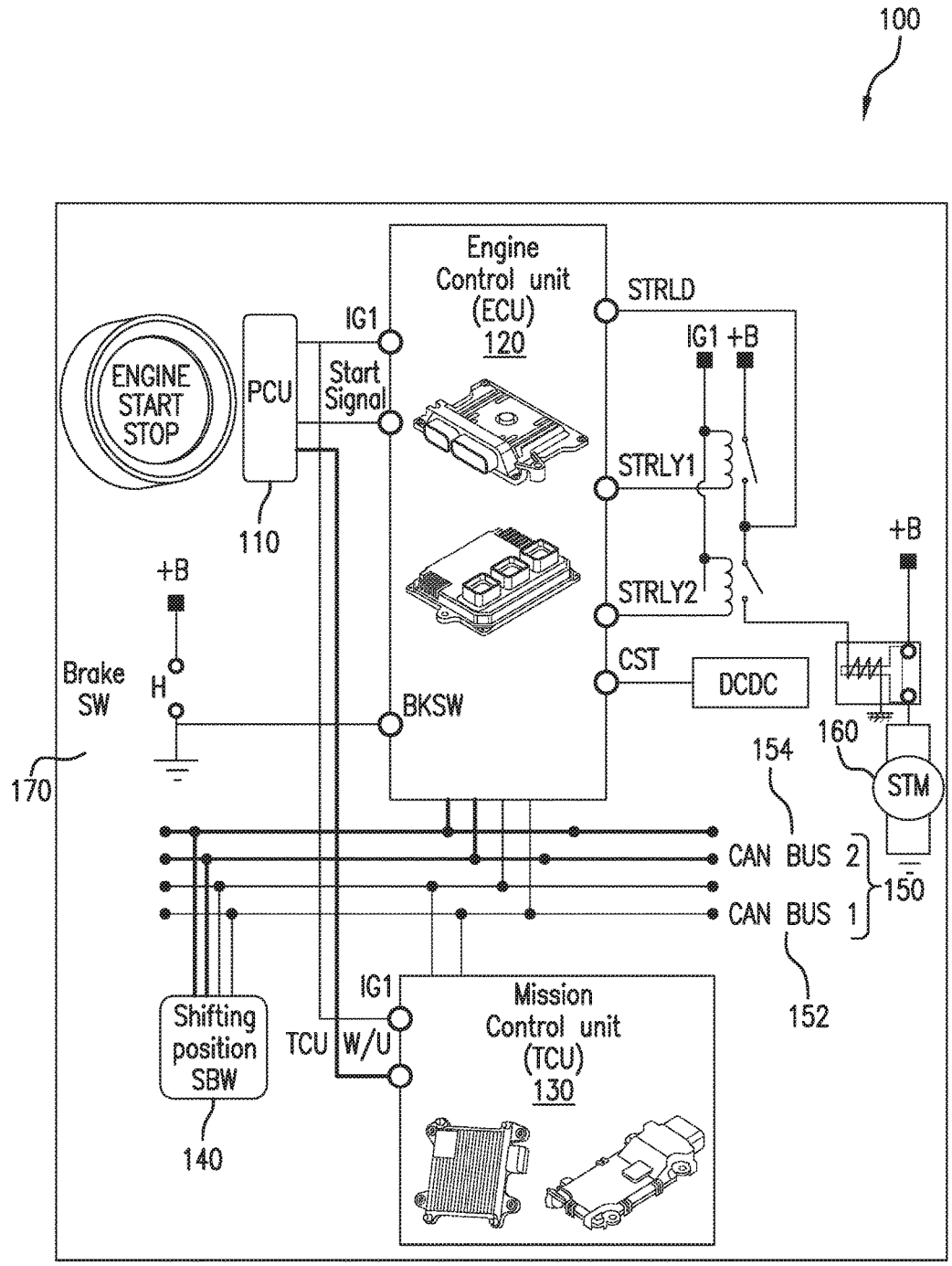
FIG. 1 is an exemplary dual controller area network (CAN) system for starting a vehicle, according to one or more embodiments.

FIG. 1 is an exemplary dual controller area network (CAN) system 100 for starting a vehicle, according to one or more embodiments. The dual CAN system 100 may include a powertrain control unit 110 (PCU), an engine control unit 120 (ECU), a transmission control unit 130 (TCU), a shifting position unit 140, a dual CAN bus network 150 which includes a first CAN (CAN1) bus 152 and a second CAN (CAN2) bus 154, a starter motor 160 (STM), and a brake switch 170.

The ECU 120 may include one or more processors, one or more processing units, one or more memories, such as a random access memory (RAM), a read only memory (ROM), one or more storage devices, such as a hard disk drive, a flash memory, etc., which may be configured to execute one or more instructions, actions, or steps described herein. Further, the TCU 130 and the ECU 120 may generate one or more signals (e.g., as packets of data or information, etc.) and communicate information or packets of information across the dual CAN bus network 150.

The PCU 110 may generate a start signal based on a user input, such as when the engine start stop button is being pressed. Additionally, the PCU 110 may generate an ignition signal (IG1) based on when a key is in the ignition or when a key fob is within range of the PCU 110 or vehicle.

The starter motor 160 is in communication with the ECU 120 via the STRLD, STRLY 1, and STRLY 2 signal lines. The brake switch 170 generates a BKSW signal which is utilized to enable starting of the starter motor 160. The ECU 120 may detect whether the brake pedal is being pressed based on the BKSW signal, and enable starting of the starter motor 160 accordingly. In other words, the ECU 120 may enable starting of the starter motor 160 based on a press of the brake pedal, indicated by the BKSW signal.

The TCU 130 is in communication with the ECU 120 via the dual CAN bus network 150. In other words, both the CAN1 bus 152 and the CAN2 bus 154 are utilized to transmit information between the TCU 130 and the ECU 120. In one or more embodiments, information or data packs sent via the CAN1 bus 152 and the CAN2 bus 154 are used as double checks against one another. Further, the dual CAN bus network 150 may facilitate communication between other components of the vehicle and the ECU 120, such as the shifting position unit 140. The dual CAN bus network 150 may be an all-CAN communication system which links the TCU 130 and the ECU 120, thereby replacing the mixed CAN/direct wire system.

The ECU 120 controls actuation of the starter motor 160 based on one or more signals from the CAN1 bus 152, one or more signals from the CAN2 bus 154, a signal from the PCU 110 (e.g., the start signal generated from user input of the engine start stop button), and the brake switch signal from the brake switch 170. Thus, the ECU 120 controls actuation of the starter motor 160 based on the start signal. When the relays connecting the starter motor 160 to the ECU 120 are actuated by the ECU 120, the starter motor 160 places an engine of the vehicle in a starting mode where engine starting may occur. In any event, the dual CAN bus network 150 of the dual CAN system 100 enables a safe, reliable automatic start-up of the engine of the vehicle based on one or more criteria being met, which are associated with one or more signals transmitted from the TCU 130 to the ECU 120 via the CAN1 bus 152 and the CAN2 bus 154.

In one or more embodiments, the starter motor 160 may be actuated by the ECU 120 or controlled, started, or placed in a starting mode using a drive by wire (DBW) setup which does not include a direct wire connection from the FI-ECU (e.g., ECU 120) to the TCU 130. Judgements or determinations made by the ECU 120, such as a determination of a shifter or transmission position are detected based on information or signals received via the two or more controller area network (CAN) buses of the dual CAN bus network 150. In other words, communication of information pertaining to the transmission position utilized for auto start judgement of the starter motor 160 by the ECU 120 may occur over the dual CAN bus network 150, which includes the CAN1 bus 152 and the CAN2 bus 154.

In any event, the dual CAN system 100 utilizes the dual CAN bus network 150 to relay information regarding the transmission position (e.g., from the TCU 130) and resulting judgement procedure to enable or disable the starting of the engine via the starter motor 160. The dual CAN bus network 150 may provide information regarding the transmission position separately, via the CAN1 bus 152 and the CAN2 bus 154 to determine whether to enable (e.g., in either an auto mode or a manual start mode) or to disable start actuation of the vehicle starter motor, either before, during, or after starting of the engine.

Stated another way, the ECU 120 may start the engine according to one or more different modes, such as an auto mode, manual mode, or disabled mode. These modes may be determined based on information, data, or signals received by the ECU 120 across the dual CAN bus network 150. For example, a CAN transceiver (not shown) of the ECU 120 may be utilized to determine if a start enable signal has been received from the TCU 130, determine an auto, manual, or disable mode or state for starter motor 160 operation, detect when the TCU 130 turns off, and/or determine if the starter motor 160 may be enabled.

Figure 2:
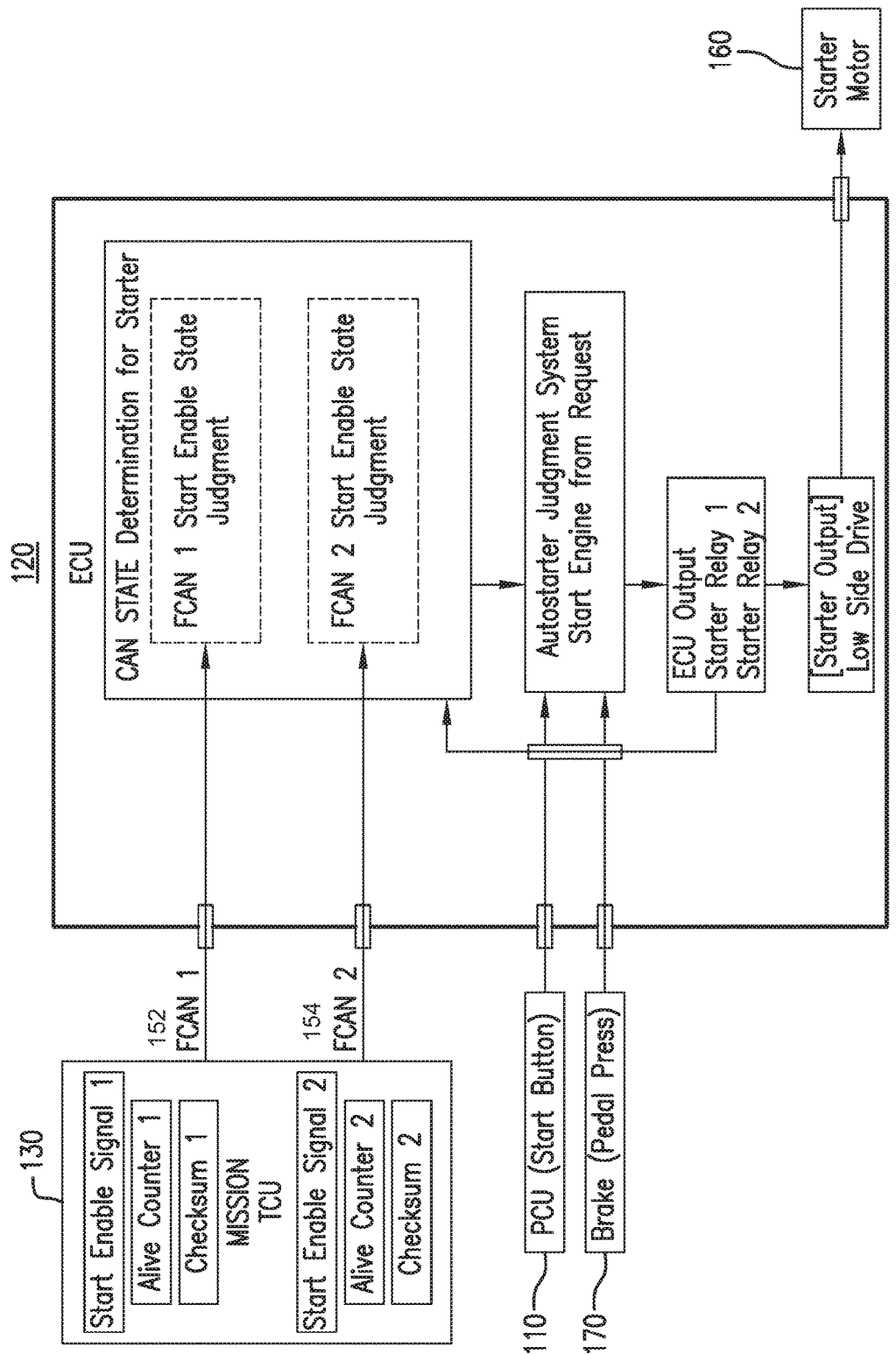
FIG. 2 is an exemplary dual controller area network (CAN) system for starting a vehicle, according to one or more embodiments.

In this regard, FIG. 2 illustrates exemplary information or signal flow between the ECU 120 and the TCU 130 of the dual CAN system 100. As seen in FIG. 2, the CAN1 bus 152 and the CAN2 bus 154 of the dual CAN bus network 150 are used to transmit a first start enable signal, a first alive counter signal, a first checksum signal, a second start enable signal, a second alive counter signal, and a second checksum signal from the TCU 130 to the ECU 120, respectively. In other words, the TCU 130 transmits the first start enable signal, the first alive counter signal, and the first checksum signal, via the CAN1 bus 152 to the ECU 120 and the TCU 130 transmits the second start enable signal, the second alive counter signal, and the second checksum signal, via the CAN2 bus 154 to the ECU 120. The ECU 120 controls actuation of the starter motor 160 based on the first start enable signal, the first alive counter signal, the first checksum signal, the second start enable signal, the second alive counter signal, and the second checksum signal. Based on these signals (in addition to the start signal from the PCU 110 and the BKSW signal from the brake switch 170), the ECU 120 make or determines a judgement as to the starting mode for the engine and generates the STRLY 01 and STRLY 02 (e.g., starter relay) output signals which control (e.g., actuate or not actuate) one or more relays connected to the starter motor 160, thereby controlling the actuation or starting of the starter motor 160.

Once these respective signals are received by the ECU 120, the ECU 120 may store the corresponding information in a memory, such as a random access memory (RAM) and reference the corresponding signal information utilizing addresses or pointers. The CAN state determination for starter module of the ECU 120 may determine the CAN state of the CAN1 bus 152 and the CAN2 bus 154 (e.g., OK, NG, CS/AC, NR). These states are described in greater detail in FIGS. 3-4. The auto-starter judgement system of the ECU 120 may utilize one or more of the mode selection tables described herein to generate a determination as to which mode and whether or not to start the starter motor 160. Thus, the ECU 120 may receive information or data packets from the CAN1 bus 152 and the CAN2 bus 154, determine states based on the received information, and select a mode for the starter motor 160 based on the states of the CAN1 bus 152 and the CAN2 bus 154.

The alive counters (e.g., the first alive counter signal and the second alive counter signal) may follow a pattern or be cyclic, such as 0, 1, 2, 3, 0, 1, 2, 3, etc. Because the alive counters follow a predictable pattern, the ECU 120 may perform a comparison of the received alive counter signal against an expected result based on the pattern of the alive counter. Similarly, the checksum enables a check or verification that information sent along the dual CAN bus network 150 is accurate based on a checksum of the information sent. In this way, the ECU 120 may determine the state of the CAN1 bus 152 and the state of the CAN2 bus 154.

FIG. 3 is an exemplary mode selection table utilized by an engine control unit (ECU) of a dual controller area network (CAN) system 100 for starting a vehicle, according to one or more embodiments. The mode selection of FIG. 3 is utilized by the ECU 120 when the engine is not already in a starting mode or in the process of starting. As seen, the CAN1 bus 152 and the CAN2 bus 154 may deliver information from the TCU 130, which includes four possible signals indicative of different conditions, such as a start enable condition, a checksum, and an alive counter. The autostarter judgment system of the ECU 120 may determine the starting mode for the engine based on the states of the CAN1 bus 152 and the CAN2 bus 154, listed in the left and center columns of the table, respectively.

The ECU 120 may, for example, generate a start enable signal which is indicative of the starting mode for the engine, implemented by the starter motor 160. This can be seen in the right column (e.g., mode select column) of FIG. 3, which includes an auto mode, a manual mode, and a disabled mode. In FIG. 3, the start enable signal may indicate the auto mode or 'passing' when the vehicle is in park (P) or neutral (N) and this is confirmed by both the CAN1 bus 152 and the CAN2 bus 154 (e.g., OK). The start enable signal may indicate the disabled mode (e.g., NG) when the vehicle is not in P or N based on information from either the CAN1 bus 152 and the CAN2 bus 154. Similarly, when the checksum fails or the alive counter fails, a CS/AC signal received by either the CAN1 bus 152 or the CAN2 bus 154 results in the start enable signal being disabled. When no signal (e.g., NR signal) is received from either the CAN1 bus 152 or the CAN2 bus 154, the start enable signal is also disabled (e.g., indicative of the disabled mode).

In any event, the ECU 120 may enable actuation of the starter motor 160 in an automatic mode based on a first start enable signal from the CAN1 bus 152 being associated with the vehicle in park (P) or neutral (N) and a second start enable signal from the CAN2 bus 154 also being associated with the vehicle in P or N. In other words, if both the CAN1 bus 152 and the CAN2 bus 154 provide the ECU 120 with signals indicating that the vehicle is in P or N, there is a double confirmation that the vehicle is parked or in neutral, and automatic starting mode may be actuated accordingly (e.g., presuming other conditions are met, such as the key being in the ignition (IG1), the brake pedal being pressed, the start button being pushed (to generate the start signal), etc.).

If merely one of the CAN buses provides the OK signal indicative of the vehicle being in P or N and the other CAN bus provides the NR signal (e.g., which may be no signal at all), the ECU 120 may enable manual starting of the starter motor 160, prior to the engine being in the starting mode. In other words, the ECU 120 may enable actuation of the starter motor 160, before the engine is in the starting mode, in a manual mode based on the first start enable signal from the CAN1 bus 152 being associated with the vehicle in P or N or the second start enable signal from the CAN2 bus 154 being associated with the vehicle in P or N and the other start enable signal being associated with the NR signal. The remaining conditions, such as any combination of a failing checksum signal or a failing alive counter signal (CS/AC) or a start enable signal which is indicative of the vehicle not being in either P or N (NG) from either the CAN1 bus 152 or the CAN2 bus 154, results in a determination of disabling the starter motor 160 by the ECU 120 or the autostarter judgement system thereof.

In automatic mode, when the brake pedal is pressed, and the start signal is received from a brief press of the engine start stop button, the ECU 120 will command the starter motor 160 to start the vehicle. In manual mode, the ECU 120 will command the starter motor 160 to start the vehicle as long as the engine start stop button is pressed, and the start signal is being generated by the PCU 110.

FIG. 4 is an exemplary mode selection table utilized by an engine control unit (ECU) of a dual controller area network (CAN) system 100 for starting a vehicle, according to one or more embodiments. Similarly to FIG. 3, the table of FIG. 4 utilizes the same naming convention for the signals received by the CAN1 bus 152 and the CAN2 bus 154. FIG. 4 is utilized by the ECU 120 to determine the start enable signal when the information or data packets from the CAN1 bus 152 and the CAN2 bus 154 change from the scenarios outlined in FIG. 3 during the starting of the engine. For example, it can be seen that when a NR signal is received by one of or both the CAN1 bus 152 and the CAN2 bus 154 during starting of the engine (e.g., while the engine is in the starting mode), the ECU 120 will continue operation (e.g., maintain the start enable signal) of the starter motor 160 based on the current operating condition or starting mode. In other words, if the starter motor 160 is in automatic mode, when a NR signal is received at either of the CAN1 bus 152 or the CAN2 bus 154, then the ECU 120 will continue operation of the starter motor 160 in automatic mode. Similarly, if the starter motor 160 is in manual mode, when a NR signal is received, then the ECU 120 will continue operation of the starter motor 160 in manual mode. Stated another way, the ECU 120 may enable actuation of the starter motor 160, while the engine is in the starting mode, based on the first start enable signal from the CAN1 bus 152 being associated with the vehicle in P or N or the second start enable signal from the CAN2 bus 154 being associated with the vehicle in P or N or the first start enable signal or the second start enable signal being associated with the NR signal (or both being associated with the NR signal).

Figure 5:
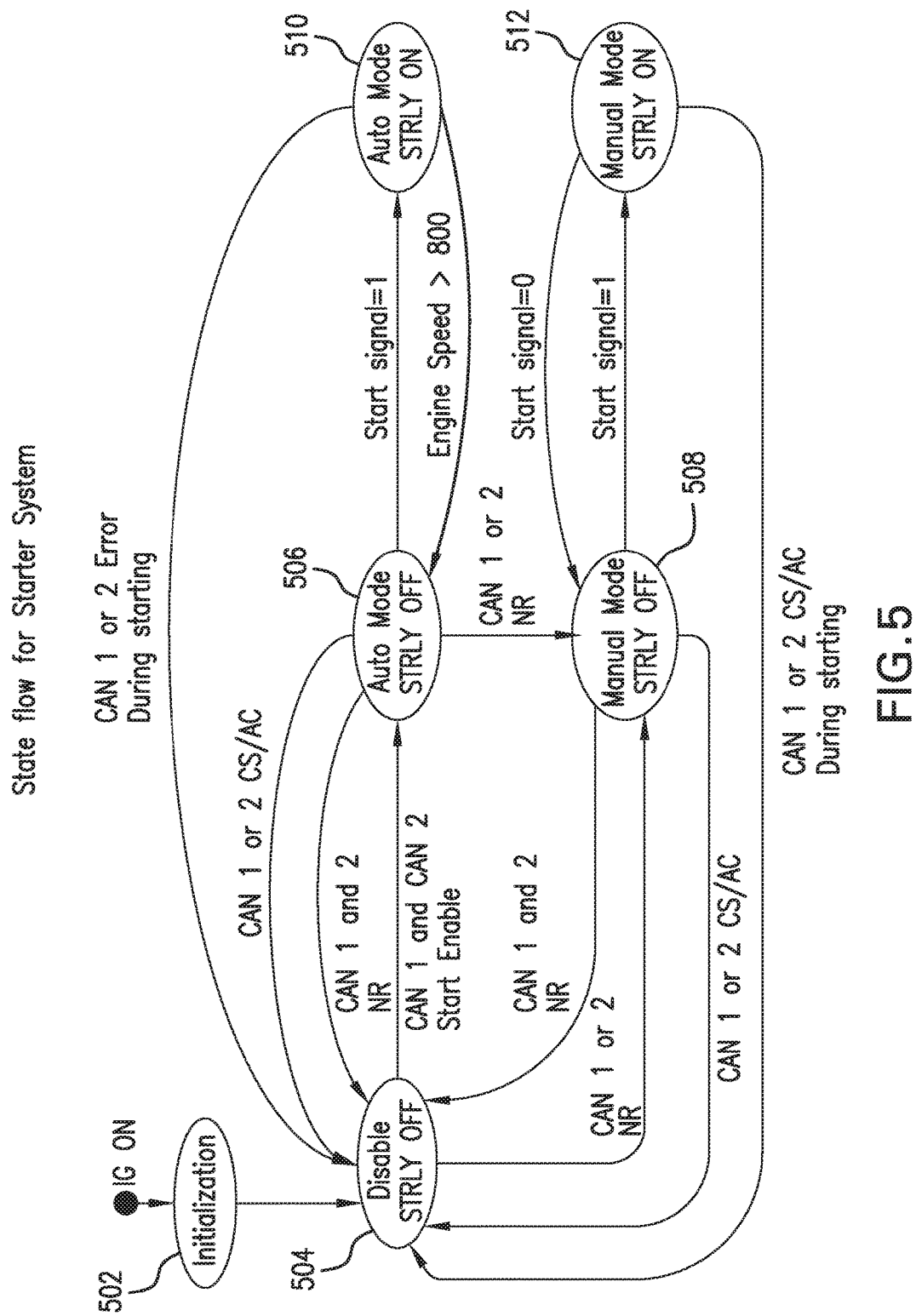
FIG. 5 is an exemplary state machine followed by an engine control unit (ECU) of a dual controller area network (CAN) system for starting a vehicle, according to one or more embodiments.

FIG. 5 is an exemplary state machine followed by the ECU 120 of a dual controller area network (CAN) system 100 for starting a vehicle, according to one or more embodiments. At 504, after initialization 502, the STRLY relays are disabled or off, effectively disabling the starter motor 160 and thus, starting of the motor. At 506, the ECU 120 places the system 100 in auto mode based on the CAN1 bus 152 and the CAN2 bus 154 both providing an 'OK' signal (based on the table from FIG. 3). If a checksum or alive counter error occurs on either the CAN1 bus 152 or the CAN2 bus 154 or both buses have the NR signal, the ECU 120 sets the mode from auto mode to disabled mode. Alternatively, at 508, the ECU 120 places the system 100 in manual mode based on one of the CAN1 bus 152 and the CAN2 bus 154 providing an 'OK' signal and the other providing the NR signal (also based on the table from FIG. 3). Similarly, if a checksum or alive counter error occurs on either the CAN1 bus 152 or the CAN2 bus 154 or both buses have the NR signal, the ECU 120 sets the mode from manual mode to disabled mode. Thus, the ECU 120 may make a determination as to whether to initialize the engine in the automatic mode 506 or the manual mode 508 based on the mode selection tables of FIG. 3.

At 510 and 512, the starter motor 160 is engaged and starting the engine due to the ECU 120 activating the STRLY (e.g., starter relays of FIG. 1) to be on according to the automatic mode or the manual mode, respectively. However, if any failing checksum signal or failing alive counter signal is received at 510 or 512, the ECU 120 disables the starter relay or STRLY signal, thereby shutting down the starter motor 160 at 504. For example, the ECU 120 may disable actuation of starter motor 160 based on a failing checksum signal or a failing alive counter signal from either the CAN1 bus 152 or the CAN2 bus 154. As another example, the ECU 120 may disable actuation of starter motor 160, while the engine is in the starting mode, based on consecutive failing checksum signals or consecutive failing alive counter signals from either the CAN1 bus 152 or the CAN2 bus 154. Also, if the engine successfully starts (e.g., the engine speed or engine RPMs rises above a predetermined RPM level, such as 800 rpm), the STRLY is also disabled at 506, thereby ending the start sequence.

Figure 6:
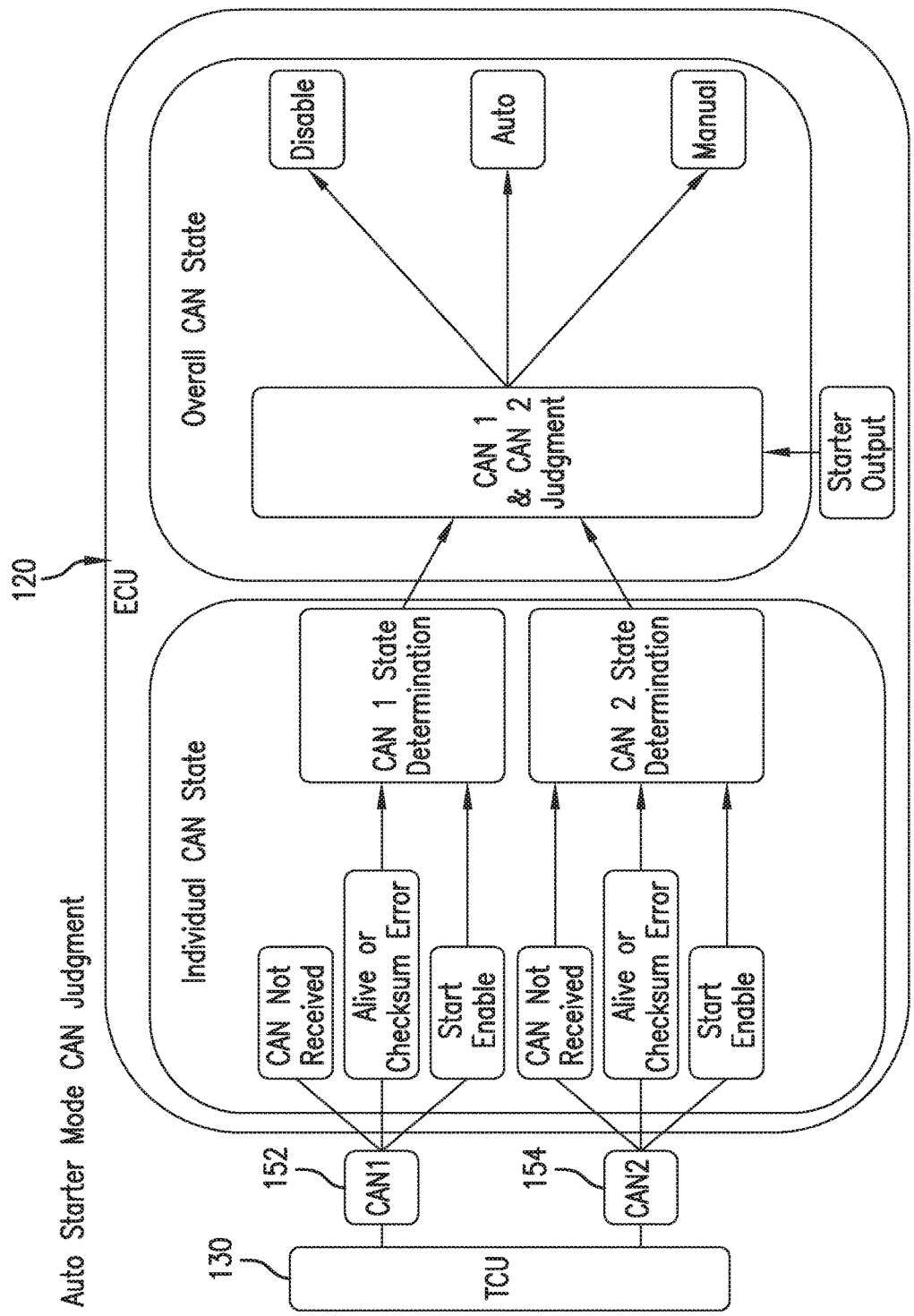
FIG. 6 is an illustration of exemplary logic followed by an engine control unit (ECU) of a dual controller area network (CAN) system for starting a vehicle, according to one or more embodiments.

FIG. 6 is an illustration of exemplary logic followed by the ECU 120 of a dual controller area network (CAN) system 100 for starting a vehicle, according to one or more embodiments. Similarly to FIG. 5, FIG. 6 illustrates how the CAN1 bus 152 and CAN2 bus 154 of the dual CAN bus network 150 facilitates verification prior to the ECU 120 determining a mode for the engine. As seen in FIG. 6, the TCU 130 transmits information or data to the ECU 120 via the CAN1 bus 152 and the CAN2 bus 154. The information from each CAN bus 152, 154 may include different sets of information, such as whether that CAN is transmitting information (e.g., NR or not), an alive counter signal, a checksum signal, and a start enable signal. The first alive counter signal, the first checksum signal, and CAN NR of the CAN1 bus 152 are initially judged by the CAN1 state determination module of the ECU 120 to determine the state of the CAN1 bus 152. Similarly, the second alive counter signal, the second checksum signal, and CAN NR of the CAN2 bus 154 are judged by the CAN2 state determination module of the ECU 120 to determine the state of the CAN1 bus 152. These two CAN states are input into the overall CAN state determination module to determine a starting mode for the engine (e.g., according to FIGS. 3-4).

FIGS. 7-15 are illustrations of example scenarios prior to, during, and after starting for a dual controller area network (CAN) system 100 for starting a vehicle, according to one or more embodiments.

Figure 7:
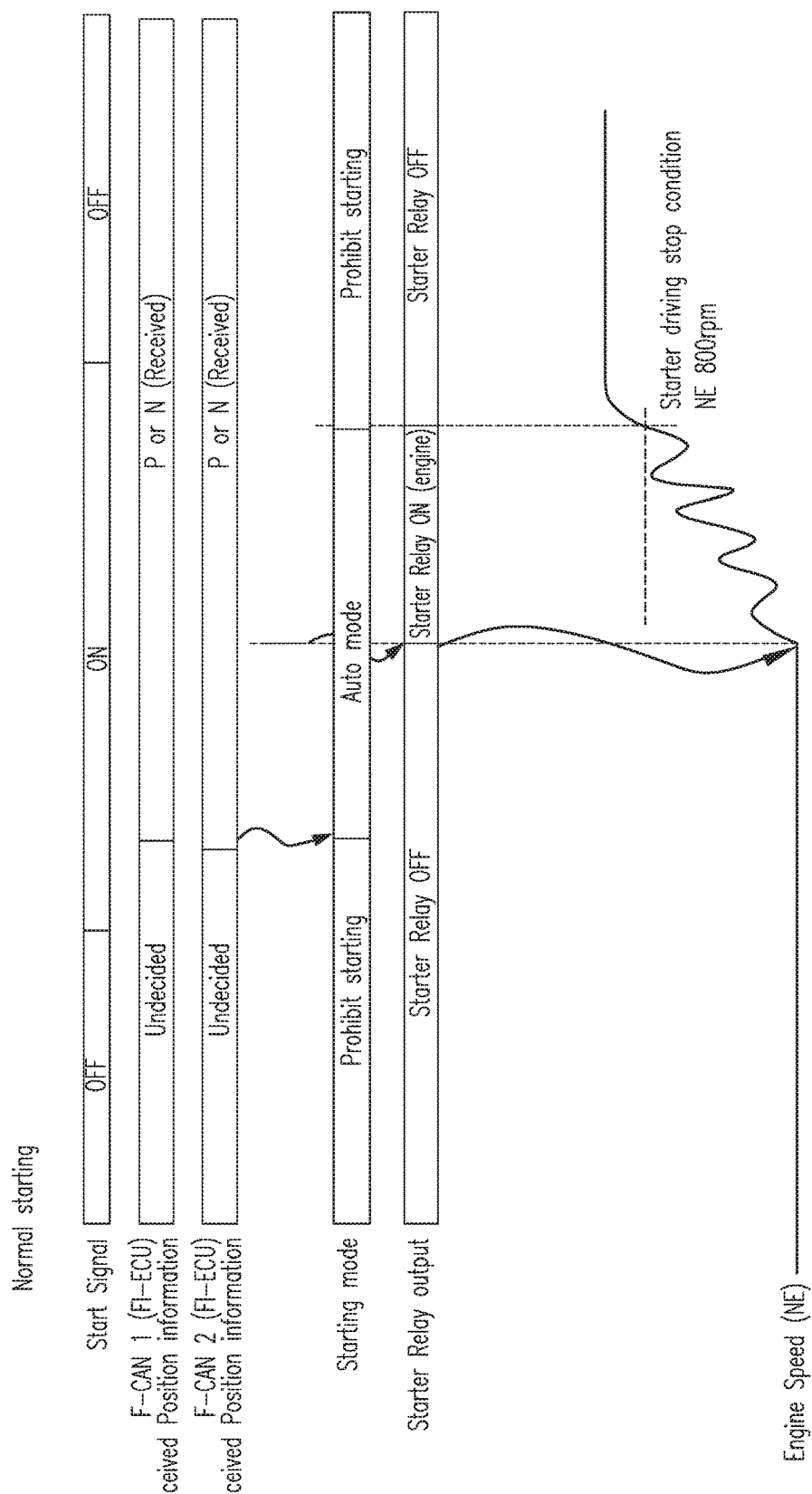
FIGS. 7-13 are illustrations of example scenarios prior to, during, and after starting for a dual controller area network (CAN) system for starting a vehicle, according to one or more embodiments.

In FIG. 7, normal starting of the engine is occurring, as seen at the starting mode signal which changes from prohibit starting (e.g., disabled mode) to auto mode. This occurs because the CAN1 bus 152 and the CAN2 bus 154 both confirm that the vehicle is in P or N. Once the starter relay output changes from off to on, the engine may begin starting, and will shut off once the engine reaches a threshold RPM speed.

Figure 8:
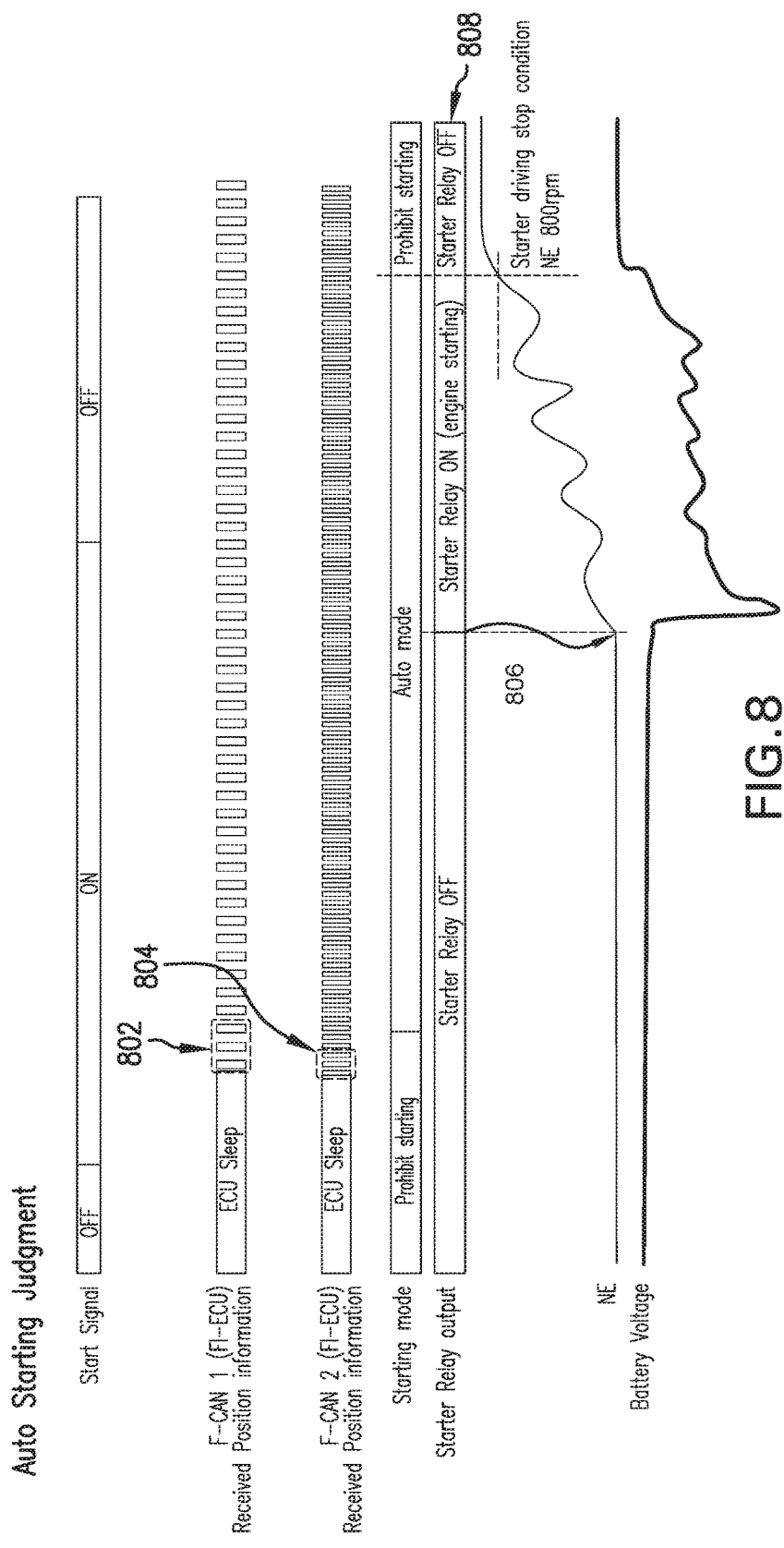

In FIG. 8, it can be seen that the CAN1 bus 152 (F-CAN1) may be associated with a first period and the CAN2 bus 154 (F-CAN2) may be associated with a second period which is different than the first period, as indicated by the dashed lines around the consecutive packets of information sent by the TCU 130 to the ECU 120. The packets shown at 802 and 804 are indicative of an 'OK' signal. The packets of information transmitted over the dual CAN bus network 150 may include the start enable signals, the checksum signals, and the alive counter signals. As seen here, once three packets of passing information 802 and 804 are received by the ECU 120, the starting mode is set to auto mode by the ECU 120, which effectively causes the starter motor 160 to begin starting the engine at 806 (and stop at 808 when the engine has started). It will be appreciated that according to other aspects, other numbers of packets of passing information (e.g., two, four, etc.) may be utilized by the ECU 120 to determine whether or not to change the starting mode to auto mode or manual mode from disabled mode.

Figure 9:
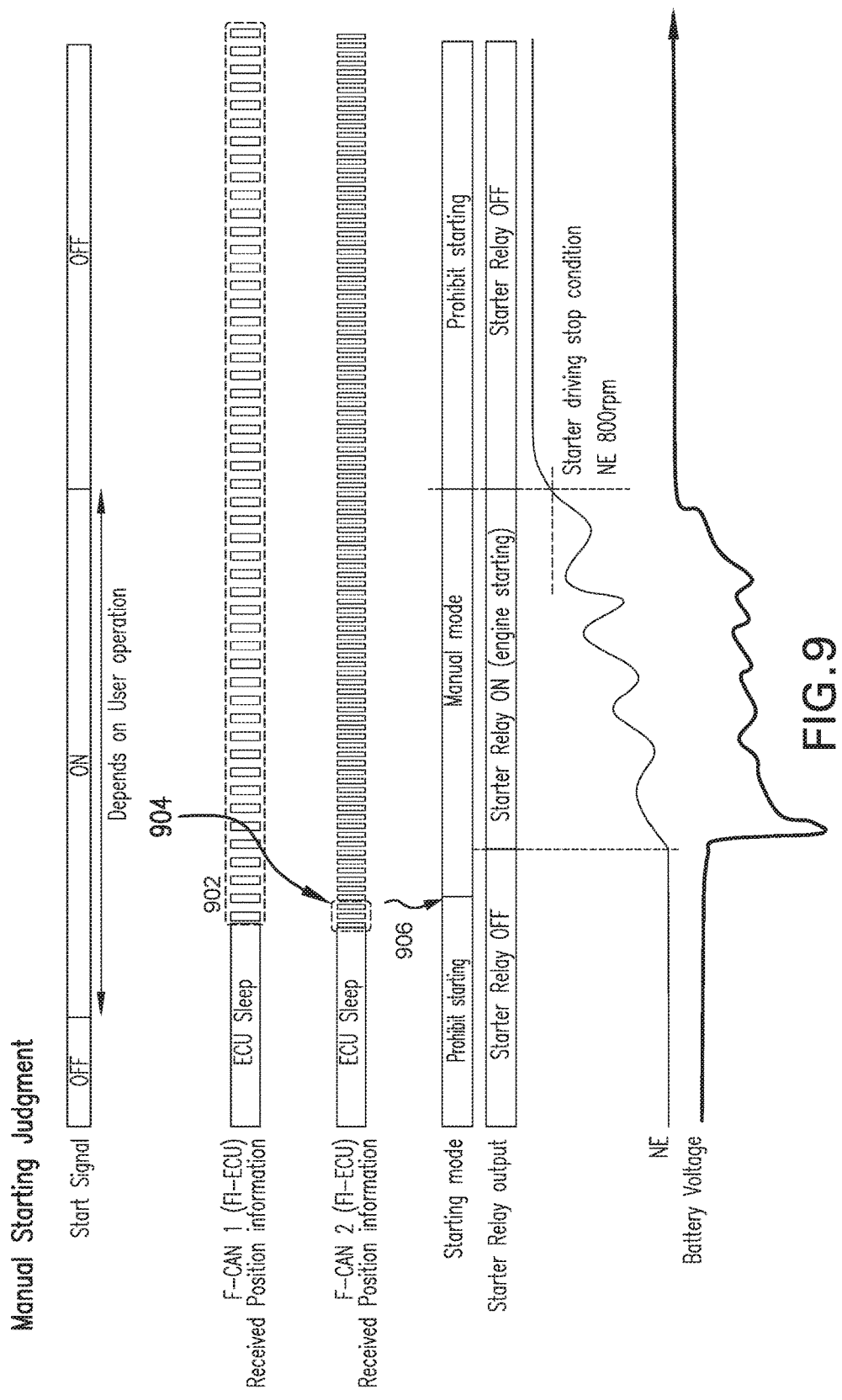

In FIG. 9, the CAN1 bus 152 is sending the NR signal 902 the entire time. In this example, because the CAN2 bus 154 has sent three passing packets at 904, indicated by the dashed line, the ECU 120 orders the engine to start in manual mode, as seen at the starting mode signal line at 906. Thereafter, the ECU 120 commands the starter motor 160 to begin starting the engine at and stop after the engine has reached a threshold rpm speed.

Figure 10:
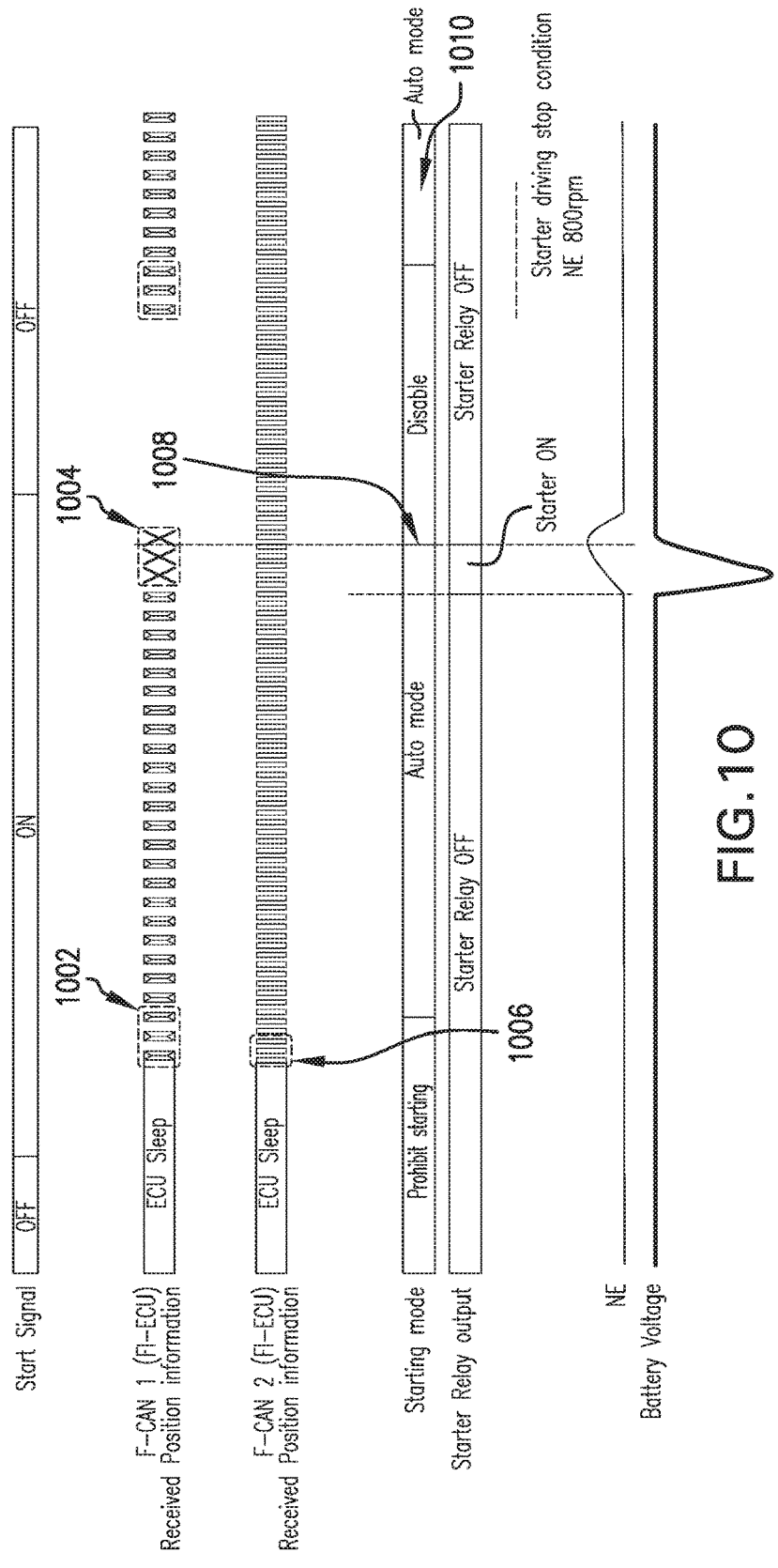

In FIG. 10, the ECU 120 disables 1008 the engine starting because a failing alive counter signal or a failing checksum signal 1004 is received at the CAN1 bus 152 during the starting of the engine (until the checksum and alive counter pass again at 1010), even though the checksums and alive counters passed earlier at 1002 and 1006. The reasoning for this can be found in the mode selection table in FIG. 4.

Figure 11:
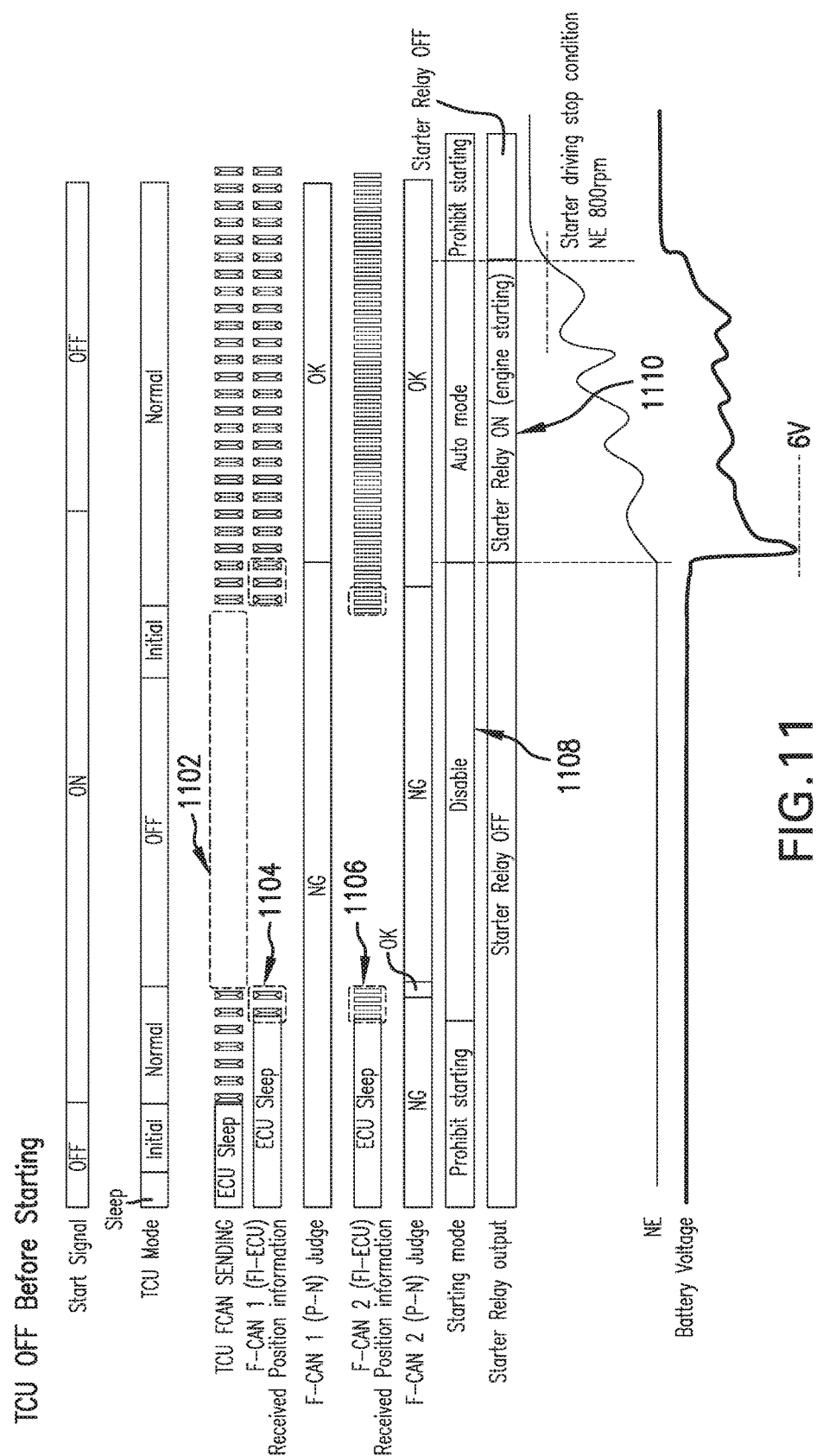

FIG. 11 shows a similar scenario where the TCU 130 turns off, causing the CAN1 bus 152 and the CAN2 bus 154 to provide NR or NG signals prior to the starting of the engine. At 1102 and 1104, the TCU 130 turns off, prior to transmitting consecutive passing packets of information to the ECU 120. Although passing packets are received at 1106, the CAN2 bus 154 is set to the NG signal when the TCU 130 turns off. Thus the ECU 120 disables 1108 the starter motor by setting the system 100 to be in disabled mode. At 1106, when consecutive passing packets are received, the ECU 120 enables starting of the starter motor at 1110 by setting the starting mode to auto or automatic mode.

In one or more embodiments, the ECU 120 may detect when the TCU 130 goes to sleep or turns off based on information from the dual CAN bus network 150.

Figure 12:
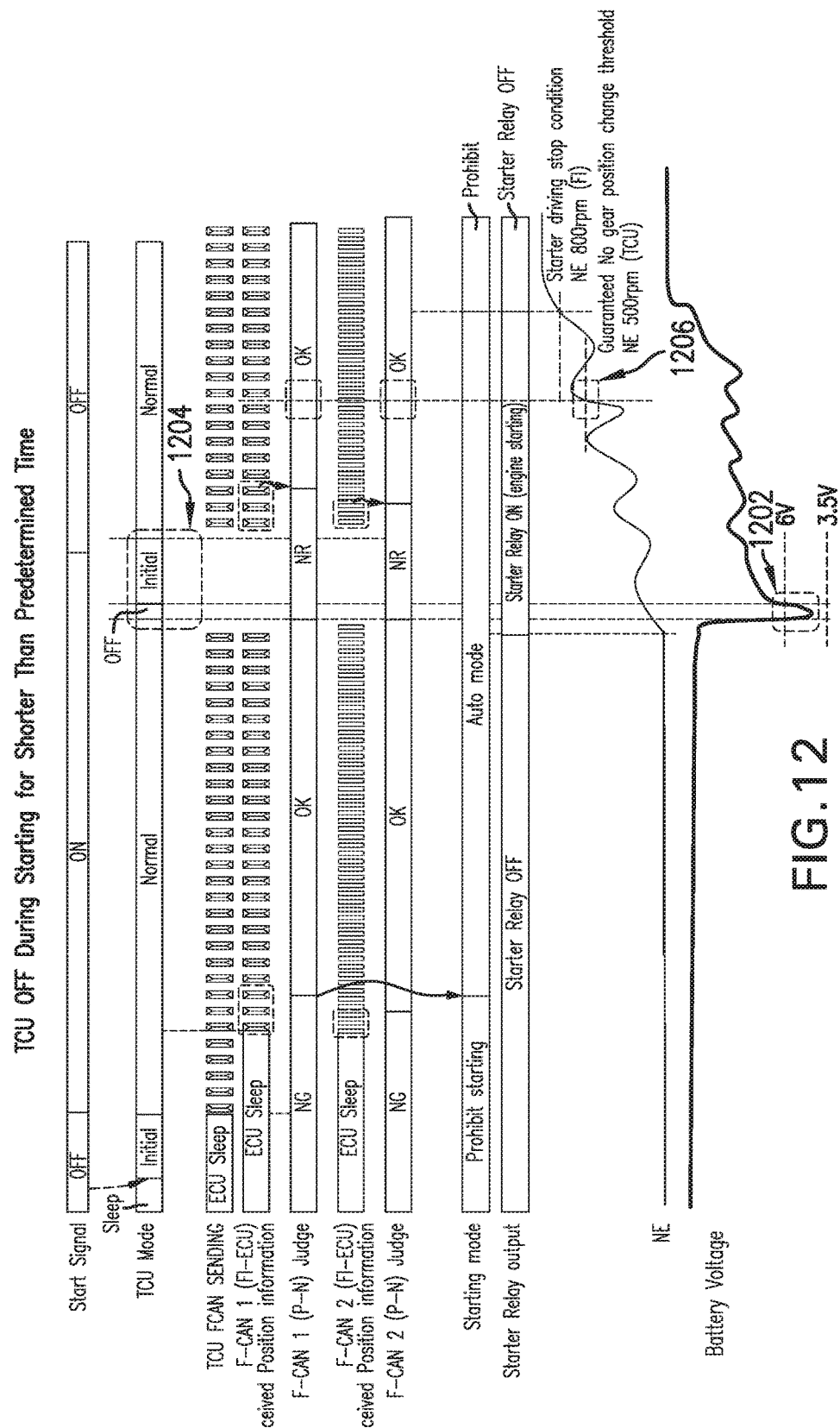

FIG. 12 is an illustration of an example scenario where a 'short' off period 1204 occurs for the TCU 130, such as during a TCU 'reset'. During the off period 1204, the TCU 130 may not transmit data, information, or signals to the ECU 120. However, because the TCU 130 may turn off for a short period of time during engine starting or when the engine is in the starting mode between 1202 and 1206, the ECU 120 may continue to enable actuation of the starter motor 160 during this time. As seen at 1202, the battery voltage drops below 6V, which is an exemplary operating voltage for the TCU 130, thereby causing the TCU 130 to turn off. Because the off period 1204 is shorter than a threshold amount of time, the ECU 120 keeps the starting mode as auto mode. At 1206, the engine speed is above the TCU guarantee threshold, and the position information is checked via the dual CAN bus network 150. Here, because the CAN1 bus 152 and the CAN2 bus 154 are both associated with OK signals, the ECU 120 sets or maintains auto mode. For example, the ECU 120 may enable actuation of the starter motor 160, while the engine is in the starting mode, based on a first start enable signal from the CAN1 bus 152 being associated with the NR signal and a second start enable signal from the CAN2 bus 154 being associated with the NR signal for less than a threshold period of time. In this way, the 'short' off period 1204 is defined as a period where the engine is already in the starting mode and no information is received by the ECU 120 from the TCU 130 for less than the threshold period of time. Thus, according to one aspect, the ECU 120 enables operation or starting of the engine to continue despite this 'short' off period 1204.

Figure 13:
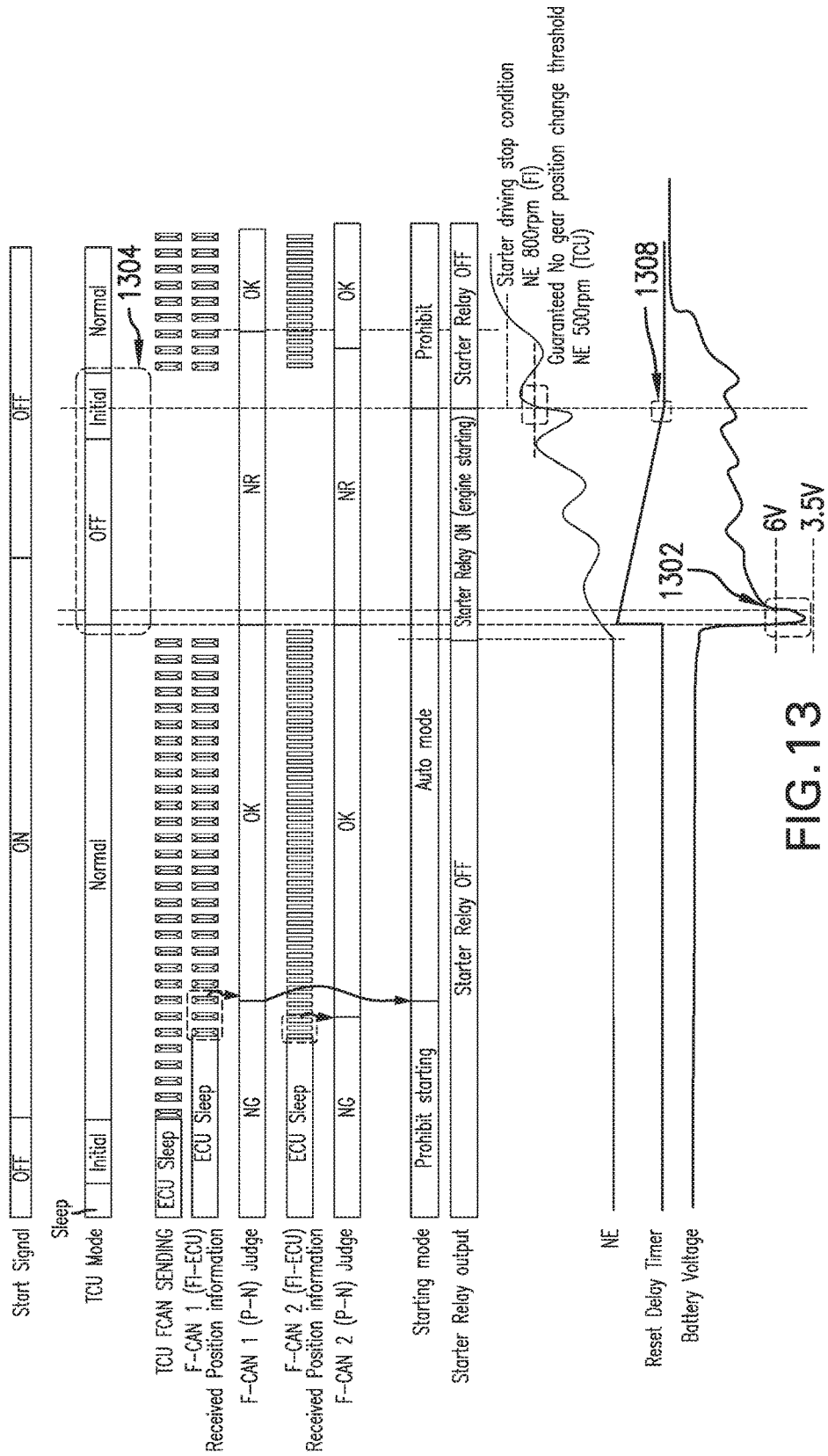

FIG. 13 is an illustration of an example scenario where a 'long' off period 1304 occurs on the TCU 130. Conversely, the 'long' off period 1304 is a scenario where the engine is already in the starting mode and no information is received by the ECU 120 from the TCU 130 for greater than the threshold period of time at 1304. In this scenario, the ECU 120 may disable actuation of the starter motor 160, while the engine is in the starting mode, based on a first start enable signal from the CAN1 bus 152 being associated with a not received (NR) signal and a second start enable signal from the CAN2 bus 154 the NR signal for greater than a threshold period of time at 1304.

Explained another way, during the engine starting in auto mode, the battery voltage drops 1302 below an operating voltage (e.g., 6V), thereby causing the TCU 130 to turn off. This can be seen at 1304. As seen at 1308, the reset delay timer (e.g. representing the threshold amount of time which defines longer than the predetermined amount of time) has counted down, causing the starter relay to be turned off. In other words, if the TCU 130 has not sent a signal to the ECU 120 after a threshold amount of time, the ECU 120 sets the starting mode to disabled, thereby disabling starting of the engine.

Figure 14:
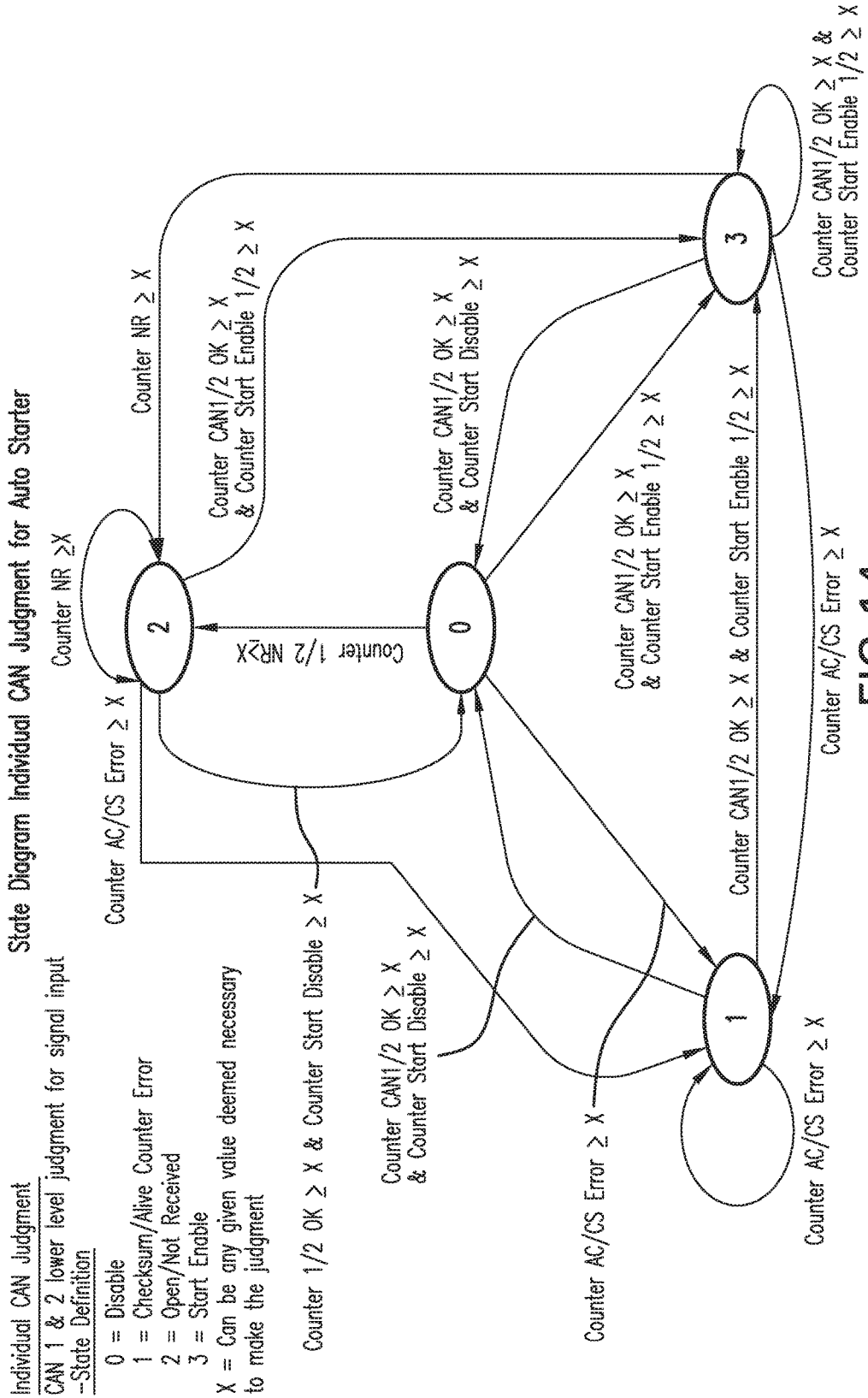
FIGS. 14-15 are exemplary state machines followed by an engine control unit (ECU) of a dual controller area network (CAN) system for starting a vehicle, according to one or more embodiments.
Figure 15:
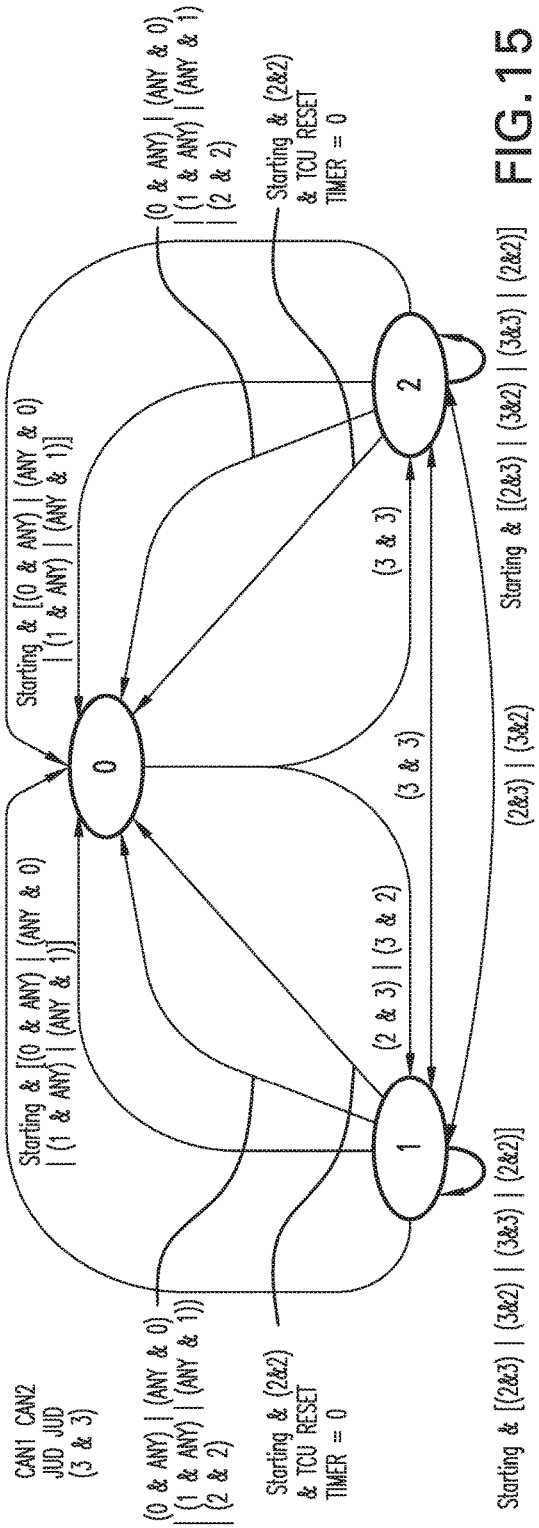

FIGS. 14-15 are exemplary state machines followed by the ECU 120 of a dual controller area network (CAN) system 100 for starting a vehicle, according to one or more embodiments.

FIG. 14 illustrates the individual CAN judgement for each of the CAN1 bus 152 and the CAN2 bus 154. In other words, the state machine of FIG. 14 takes information from a CAN bus, and sets the state of that CAN bus for the corresponding column in FIGS. 3-4. As previously discussed, a number (e.g., 'X' of FIG. 14) of consecutive identical data packets may be used to define the state for a CAN bus. By default, the state of a CAN bus begins in state '0', which is the disabled state, referred to as NG in FIGS. 3-4. State 1 is the CS/AC state, state 2 is the NR state, and state 3 of FIG. 14 is the OK state of FIGS. 3-4. For example, if 'X' is three, it would take three or more consecutive AC/CS error packets to change the state of a CAN bus from disabled ('0') to AC/CS ('1'). As another example, if three or more consecutive NR data packets were received, the ECU 120 would set the state of that CAN bus from disabled ('0') to NR ('2'). To set the CAN bus to the OK ('3') state, the ECU 120 would detect that the checksum and alive counter was passing for three consecutive packets, and that the vehicle was in P or N (start enable), as described above.

FIG. 15 illustrates the overall CAN judgement based on both the CAN1 bus 152 and the CAN2 bus 154, effectively providing similar mode select column logic as the mode select columns of FIGS. 3-4. In FIG. 15, state '0' of the state machine is the disabled mode, state '1' of the state machine is the manual mode, and state '2' of the state machine is the auto or automatic mode generated by the ECU 120. With reference to the logic for changing between these states '0' represents the disabled CAN state, '1' represents the checksum or alive counter error state, '2' represents the open or not received state, and '3' represents the start enable or OK state for that CAN.

Figure 16:
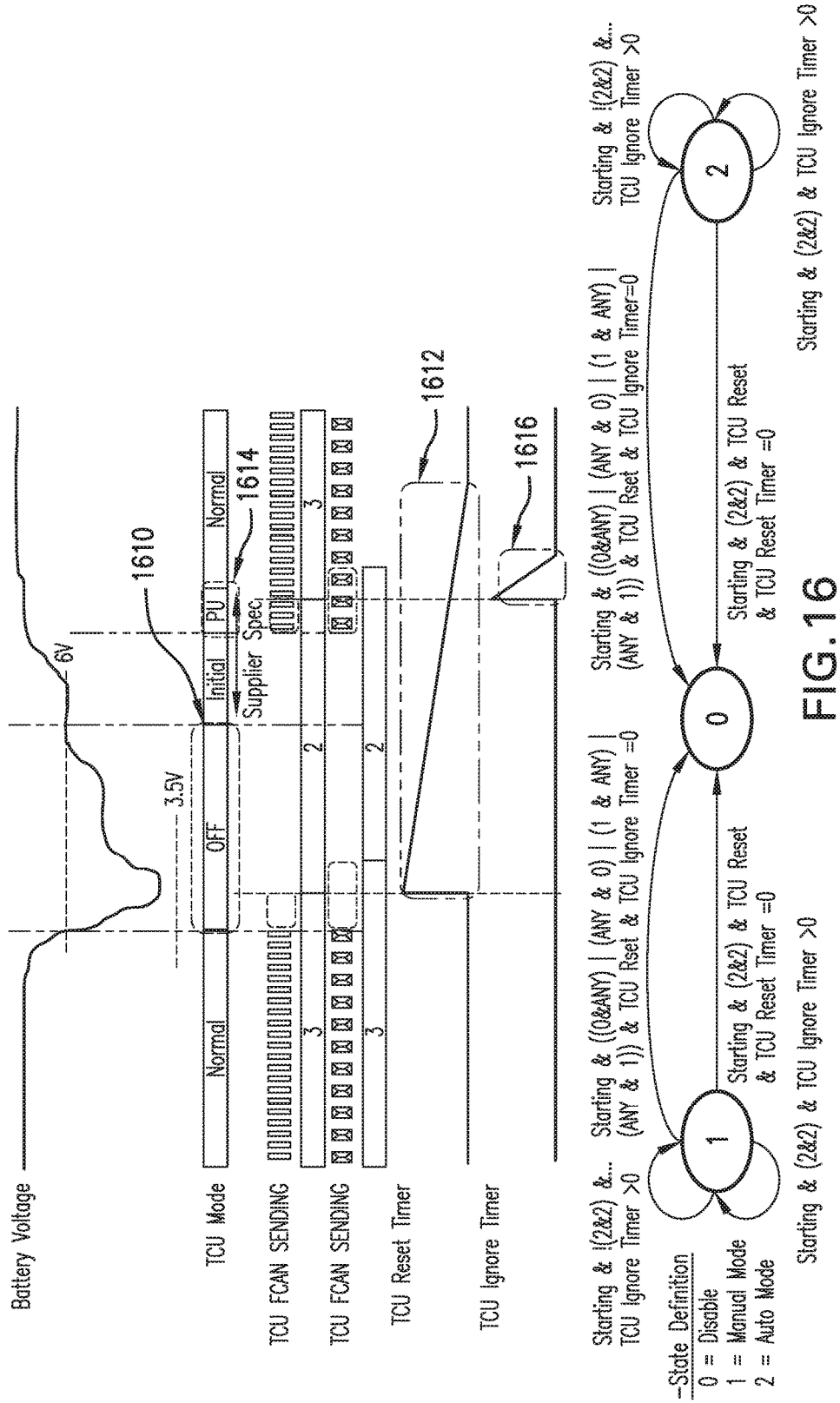
FIG. 16 is an illustration of an exemplary scenario during starting for a dual controller area network (CAN) system for starting a vehicle, according to one or more embodiments.

FIG. 16 is an illustration of an exemplary scenario during starting for a dual controller area network (CAN) system 100 for starting a vehicle, according to one or more embodiments. The ECU 120 may continue actuation of the starter motor 160 based on a TCU ignore timer signal (which is set internal to the ECU 120) when the TCU 130 is reset or turned off at 1610.

The TCU reset timer 1612 begins when a reset condition is detected and disables starting of the engine if the TCU 130 does not wake up before the TCU reset timer counts down. In one or more embodiments, the TCU reset timer countdown time is equal to a worst case time below reset voltage+a TCU initialization time.

The TCU ignore timer signal is set to count down for a predetermined amount of time after a first start enable signal from the CAN1 bus 152 and a second start enable signal from the CAN2 bus 154 are active at 1614. In this example, the ECU 120 continues actuation of the starter motor while the TCU ignore timer is counting down. The ignore timer signal countdown time may be based on a model or type of the TCU 130. Because the TCU 130 may need time to fully 'wake up' after an off period 1610, the ignore timer signal is made to count down to provide the TCU 130 with this time to begin transmission of information to the ECU 120. Once the ignore timer counts down, the ECU 120 may make a determination as to the starting of the starter motor 160 based on information received from the dual CAN bus network 150.

At 1614, the position of the transmission is undetermined while the TCU 130 is powering up (PU). Thus, at 1616, a delay is implemented via the TCU ignore timer to allow for time for the position of the transmission to be determined.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A dual controller area network (CAN) system for starting a vehicle, comprising:
    a transmission control unit (TCU);
    an engine control unit (ECU); and
    a dual CAN bus network comprising a first CAN (CAN1) bus and a second CAN (CAN2) bus,
    wherein the TCU is in communication with the ECU via the dual CAN bus network,
    wherein the ECU controls actuation of a starter motor in a first mode or a second mode based on one or more signals from the CAN1 bus and one or more signals from the CAN2 bus sent by the TCU, and
    wherein actuation of the starter motor places an engine of the vehicle in a starting mode.

2. The dual CAN system of claim 1,
    wherein the TCU transmits a first start enable signal, a first alive counter signal, and a first checksum signal, via the CAN1 bus to the ECU, and
    wherein the ECU controls actuation of the starter motor based on the first start enable signal, the first alive counter signal, and the first checksum signal.

3. The dual CAN system of claim 1,
    wherein the TCU transmits a second start enable signal, a second alive counter signal, and a second checksum signal, via the CAN2 bus to the ECU, and
    wherein the ECU controls actuation of the starter motor based on the second start enable signal, the second alive counter signal, and the second checksum signal.

4. The dual CAN system of claim 1, wherein the ECU enables actuation of the starter motor in an automatic mode based on a first start enable signal from the CAN1 bus being associated with the vehicle in park (P) or neutral (N) and a second start enable signal from the CAN2 bus also being associated with the vehicle in P or N.

5. The dual CAN system of claim 1, wherein the ECU enables actuation of the starter motor, before the engine is in the starting mode, in a manual mode based on:
    a first start enable signal from the CAN1 bus being associated with the vehicle in park (P) or neutral (N) or a second start enable signal from the CAN2 bus being associated with the vehicle in P or N; and
    the other start enable signal being associated with a not received (NR) signal.

6. The dual CAN system of claim 1, wherein the ECU enables actuation of the starter motor, while the engine is in the starting mode, based on:
    a first start enable signal from the CAN1 bus being associated with the vehicle in park (P) or neutral (N) or a second start enable signal from the CAN2 bus being associated with the vehicle in P or N; or
    the first start enable signal or the second start enable signal being associated with a not received (NR) signal.

7. The dual CAN system of claim 1, wherein the CAN1 bus is associated with a first period and the CAN2 bus is associated with a second period which is different than the first period.

8. The dual CAN system of claim 1, wherein the ECU enables actuation of the starter motor based on consecutive passing start enable signals from the CAN1 bus and consecutive passing start enable signals from the CAN2 bus.

9. The dual CAN system of claim 1, wherein the ECU disables actuation of the starter motor, before the engine is in the starting mode, based on a failing checksum signal or a failing alive counter signal from either the CAN1 bus or the CAN2 bus.

10. The dual CAN system of claim 1, wherein the ECU disables actuation of the starter motor, while the engine is in the starting mode, based on consecutive failing checksum signals or consecutive failing alive counter signals from either the CAN1 bus or the CAN2 bus.

11. The dual CAN system of claim 1, wherein the ECU enables actuation of the starter motor, while the engine is in the starting mode, based on a first start enable signal from the CAN1 bus being associated with a not received (NR) signal and a second start enable signal from the CAN2 bus the NR signal for less than a threshold period of time.

12. The dual CAN system of claim 1, wherein the ECU disables actuation of the starter motor, while the engine is in the starting mode, based on a first start enable signal from the CAN1 bus being associated with a not received (NR) signal and a second start enable signal from the CAN2 bus the NR signal for greater than a threshold period of time.

13. The dual CAN system of claim 1, wherein the ECU continues actuation of the starter motor based on a TCU ignore timer signal, wherein the TCU ignore timer signal is set to count down for a predetermined amount of time after a first start enable signal from the CAN1 bus and a second start enable signal from the CAN2 bus are active, wherein the ECU continues actuation of the starter motor while the TCU ignore timer is counting down.

14. The dual CAN system of claim 1, comprising a powertrain control unit (PCU) generating a start signal based on a user input, wherein the ECU controls actuation of the starter motor based on the start signal.

15. A dual controller area network (CAN) system for starting a vehicle, comprising:
    a transmission control unit (TCU);
    an engine control unit (ECU);
    a powertrain control unit (PCU); and a dual CAN bus network comprising a first CAN (CAN1) bus and a second CAN (CAN2) bus, wherein the TCU is in communication with the ECU via the dual CAN bus network, and wherein the ECU controls actuation of a starter motor in a first mode or a second mode based on one or more signals from the CAN1 bus, one or more signals from the CAN2 bus, and a signal from the PCU.

16. The dual CAN system of claim 15, wherein the TCU transmits a first start enable signal, a first alive counter signal, and a first checksum signal, via the CAN1 bus to the ECU, and wherein the ECU controls actuation of the starter motor based on the first start enable signal, the first alive counter signal, and the first checksum signal.

17. The dual CAN system of claim 15, wherein the TCU transmits a second start enable signal, a second alive counter signal, and a second checksum signal, via the CAN2 bus to the ECU, and wherein the ECU controls actuation of the starter motor based on the second start enable signal, the second alive counter signal, and the second checksum signal.

18. The dual CAN system of claim 15, wherein the ECU enables actuation of the starter motor in an automatic mode based on a first start enable signal from the CAN1 bus being associated with the vehicle in park (P) or neutral (N) and a second start enable signal from the CAN2 bus also being associated with the vehicle in P or N.

19. The dual CAN system of claim 15, wherein the ECU enables actuation of the starter motor, before the engine is in a starting mode, in a manual mode based on:

a first start enable signal from the CAN1 bus being associated with the vehicle in park (P) or neutral (N) or a second start enable signal from the CAN2 bus being associated with the vehicle in P or N; and the other start enable signal being associated with a not received (NR) signal.

20. A dual controller area network (CAN) system for starting a vehicle, comprising:

a transmission control unit (TCU);

an engine control unit (ECU);

a starter motor in communication with the ECU; and a dual CAN bus network comprising a first CAN (CAN1) bus and a second CAN (CAN2) bus, wherein the TCU is in communication with the ECU via the dual CAN bus network, and wherein the ECU controls actuation of the starter motor in a first mode or a second mode based on one or more signals from the CAN1 bus and one or more signals from the CAN2 bus.

* * * * *